Aug. 16, 1960 H. H. HOGE 2,949,549
TRUE CURRENT FLIP-FLOP ELEMENT
Filed Dec. 15, 1958
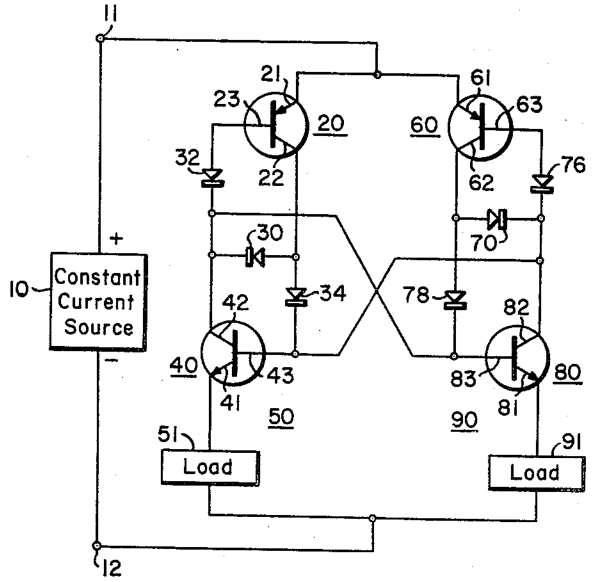
WITNESSES
E. E. Bassler
Myron E. Click
INVENTOR
Henri H. Hoge
BY F. E. Browder
ATTORNEY

United States Patent Office 2,949,549

Patented Aug. 16, 1960

2,949,549

TRUE CURRENT FLIP-FLOP ELEMENT

Henri M. Hoge, Baltimore, Md., assignor to Westinghouse Electric Corporation, East Pittsburgh, Pa., a corporation of Pennsylvania Filed Dec. 15, 1958, Ser. No. 780,329

6 Claims. (Cl. 307—88.5)

This invention relates to flip-flop elements in general and in particular to flip-flop elements having a true current output.

In the prior art it has been the custom, when needing a current output from a flip-flop element, to approximate this need through the use of a resistor on the output of a standard flip-flop element. Utilizing this method there is a needless dissipation of power and also the speed of operation is limited by the shunt capacity.

The Eccles-Jordan flip-flop circuit, which is well known in the art, is neither an ideal voltage nor an ideal current flip-flop. In order to approach a voltage flip-flop it is necessary to keep the collector resistance, when using transistors, as small as possible and feed as light a load as possible. Having taken these factors into account, the limit in speed is governed by the stray capacity and the collector resistor. The efficiency is not high because to hold the voltage low at the collector of a transistor in the flip-flop, considerable power is dissipated in the collector resistor.

By using the combination of PNP and NPN transistors, taking advantage of circuit symmetry, a voltage flip-flop has been designed and is described in the Lincoln Laboratory Report #110, Group 24, dated March 22, 1956.

The use of the voltage flip-flop or any standard Eccles-Jordan flip-flop dictates that the system so designed will be a voltage system. In digital computer applications, this means that voltage levels are changed according to the logic involved. That is, voltage levels are then channeled through the system. If now the digital system is based on current rather than voltage several advantages are gained, in particular when transistors are used as the active elements. First the importance of the collector voltage ratings can be demoted. The use of resistors can be greatly reduced and in many cases entirely eliminated. The same is true for capacitors and other linear components. The idea of changing current levels through a logic system with little or no changes of voltage reduces the importance of stray capacity. The reliability of such a system should be improved due to the very low voltages involved.

Accordingly, it is an object of this invention to provide an improved flip-flop element.

It is another object of this invention to provide an improved flip-flop element in which a minimum of power is expended in order to maintain the flip-flop in either of its two stable states.

It is another object of this invention to provide an improved flip-flop element which has a fast response, transistor anti-saturation features, and a minimum number of linear elements.

Further objects of this invention will become apparent when the following description is taken in conjunction with the accompanying drawing. In said drawing, for illustrative purposes only, there is shown a preferred embodiment of this invention.

In the drawing there is illustrated a schematic diagram of a flip-flop element embodying the teachings of this invention. Referring to the drawing there is shown a flip-flop element which comprises in general a regulated or constant current source 10 and two parallel load circuits 50 and 90.

The load circuit 50 includes transistors 20 and 40 connected in what is known in the art as a hook-collector manner. In the load circuit 90 a pair of transistors 60 and 80 are connected in the hook collector manner. It has been shown in the literature that a PNP transistor and a NPN transistor when properly connected can be made to function in much the same manner as a PNPN 4 terminal transistor which has been commonly called a hook-collector transistor in the art. One of the most important features of a hook-collector transistor is that it must have during its conductive state a minimum sustaining current flowing therethrough in order to maintain its conducting state. For a more detailed description of the operation and functions of the PNP transistor and NPN transistor, when properly connected, as compared to the function of the PNPN structure noted above, reference is made to an article entitled "Four Terminal PNPN Transistors," by J. J. Ebers, in the November 1952, issue of the proceeding of the I.R.E.

Referring again to the drawing, the structure 20 is of the PNP type and comprises a semiconductive body having an emitter 21, a collector 22, and a base 23. The transistor 40 is of the NPN type and comprises a semiconductive body having an emitter electrode 41, a collector electrode 42, and a base electrode 43. The collector electrode 22 of the transistor 20 is connected through an anti-saturation rectifier 34 to the base electrode 43 of the transistor 40. The collector electrode 42 of the transistor 40 is connected through an anti-saturation rectifier 32 in the reverse direction, to the base electrode 23 of the transistor 20. The collector electrode 22 of the transistor 20 is connected through a rectifier 30 to the collector electrode 42 of the transistor 40. The emitter electrode 21 of the transistor 20 is connected to terminal means 11. The emitter electrode 41 of the transistor 40 is connected through a load 51 to the terminal 12. A source of regulated or constant current with polarity as shown is to be applied to the terminals 11 and 12.

The transistor 60 is of the PNP type and comprises a semiconductive body having an emitter electrode 61, a collector electrode 62, and a base electrode 63. A transistor 80 is of the NPN type and comprises a semiconductive body having an emitter 81, a collector electrode 82 and a base electrode 83. The collector electrode 62 of the transistor 60 is connected through an anti-saturation rectifier 78 to the base electrode 83 of the transistor 80. The base electrode 63 of the transistor 60 is connected through an anti-saturation rectifier 76 to the collector electrode 82 of the transistor 80. The collector electrode 62 is connected through rectifier 70 to the collector electrode 82. The emitter electrode 61 of the transistor 60 is connected to the terminal 11. The emitter electrode 81 of the transistor 80 is connected through a load 91 to the terminal 12. The base electrode 83 of the transistor 80 is connected to the collector electrode 42 of the transistor 40. The base electrode 43 is connected to the collector electrode 82 of the transistor 80. That is, the base and collector electrodes of the NPN transistors 40 and 80 are cross connected.

It may be seen when examining the base and collector connected pairs of NPN and PNP transistors 20, 40 and 60, 80 that the 100% positive feedback between each transistor of each pair when activated is the closest approach to the PNPN 4 terminal transistors as described in the aforementioned article. Each of the parallel circuits 50 and 90 may be triggered "on" by applying either a positive pulse to the base of the NPN transistor or a negative pulse to the base of the PNP transistor. When one of the pair of load circuits 50 or 90 is turned "on" and is conducting it is very difficult to turn it "off." The only practical way to turn one of the circuits "off" is to short circuit the device or circuit through the use of another similar circuit. Thus if the circuit 50 were "on," then the circuit 90 must be turned "on" and the current is shunted through 90 disconnecting the circuit 50. Similarly the conducting states of the circuits 90 and 50 are reversed by turning the circuit 50 "on" which disconnects the circuit 90.

As said hereinbefore the circuits 50 and 90 function as hook-collector transistors and therefore require a certain current therethrough to maintain them in the "on" or conducting condition. To make certain that there is no question concerning this switching action the base electrode of the two NPN transistors 40 and 80 have been cross connected to their respective collector electrodes. Thus if the circuit 50 is conducting and the circuit 90 is triggered "on" by the application of a pulse of the proper polarity at the proper point, the base electrode 43 of the transistor 40 is connected to the collector electrode 82 of the now saturated NPN transistor 80. Therefore, the base electrode 43 of the transistor 40 is short circuited by the saturated transistor 80 so that the transistor 40 and thus the circuit 50 turns "off." Similarly, to reverse the conducting states of the circuits 50 and 90, the NPN transistor 40 is triggered to conduct and therefore short circuits the base electrode 83 of the transistor 80 and renders the NPN transistor 80 nonconductive. The NPN transistor on the switching side has to switch only one-half of the total current of the current source due to the splitting of the current through the two halves of the hook-collector transistor as comprised by the combination of a PNP and NPN transistor. Once the current through the circuit 50 has fallen below the amount necessary to maintain the hook-collector transistor combination of the transistors 20 and 40 in conduction all the current will flow through the circuit 90. The reverse, of course, is true when the circuit 50 is triggered.

The aforesaid features of this invention are accomplished by adding the rectifiers as shown in the drawing. The rectifier diodes 32, 34, and 76, 74 are utilized to develop a forward voltage drop and when this forward voltage drop is added to the base-emitter diode drop of the associated transistor, the currents will split and the collector current of each of the transistors of the circuits 50 and 90 will flow through the rectifiers 30 and 70, respectively, preventing either of the transistor combinations in each of the circuits 50 and 90 from saturating.

In conclusion, it is pointed out that while the illustrated example constituting particular embodiments of my invention, I do not limit myself to the exact details shown since modification of the same may be furnished without departing from the spirit and scope of this invention.

I claim as my invention:

1. A flip-flop element, comprising, two parallel load circuits; each said load circuit including a pair of transistor devices of opposite semiconductivities; each of said transistor devices having three electrodes; a third electrode of said three electrodes of each transistor device of each pair being connected to one of two remaining electrodes of said three electrodes of the other transistor devices of each pair; circuit means including rectifier means connecting said one of two remaining electrodes of one transistor device of each pair to said one of two remaining electrodes of the other transistor devices in each pair; means connecting a current source to the other of said two remaining electrodes of each transistor device of each pair; and means connecting said third electrode of one of said transistor devices of each pair to said one of said two remaining electrodes of said like semiconductive transistor device in said other pair.

2. A flip-flop element, comprising, two parallel load circuits; each said load circuit including a pair of transistor devices of opposite semiconductivities; each of said transistor devices having three electrodes; a third electrode of said three electrodes of each transistor device of each pair being connected through rectifier means to one of two remaining electrodes of said three electrodes of the other transistor devices of each pair; circuit means connecting said one of two remaining electrodes of one transistor device of each pair to said one of two remaining electrodes of the other transistor devices in each pair; means connecting a current source to the other of said two remaining electrodes of each transistor device of each pair; and means connecting said third electrode of one of said transistor devices of each pair to said one of said two remaining electrodes of said like semiconductive transistor device in said other pair.

3. A flip-flop element, comprising, two parallel load circuits; each said load circuit including a pair of transistor devices of opposite semiconductivities; each of said transistor devices having three electrodes; a third electrode of said three electrodes of each transistor device of each pair being connected through rectifier means to one of two remaining electrodes of said three electrodes of the other transistor devices of each pair; circuit means including rectifier means connecting said one of two remaining electrodes of one transistor device of each pair to said one of two remaining electrodes of the other transistor devices in each pair; means connecting a current source to the other of said two remaining electrodes of each transistor device of each pair; and means connecting said third electrode of one of said transistor devices of each pair to said one of said two remaining electrodes of said like semiconductive transistor device in said other pair.

4. A flip-flop element, comprising, two parallel load circuits; each said load circuit including an NPN and a PNP transistor device; each transistor device having an emitter, a collector and a base electrode; the base electrodes of said transistor devices of each load circuit being connected to said collector electrodes of the other transistor device in each said load circuit; circuit means including rectifier means connecting the collector electrodes of said NPN and PNP transistor devices of each said load circuit; means connecting said base electrodes of said NPN transistor devices of each said load circuit to said collector electrodes of said NPN transistor devices of the other load circuit; and means connecting a current source to said emitter electrodes of said transistor devices.

5. A flip-flop element, comprising, two parallel load circuits; each said load circuit including an NPN and a PNP transistor device; each transistor device having an emitter, a collector and a base electrode; the base electrodes of said transistor devices of each load circuit being connected through rectifier means to said collector electrodes of the other transistor device in each said load circuit; circuit means connecting the collector electrodes of said NPN and PNP transistor devices of each said load circuit; means connecting said base electrodes of said NPN transistor devices of each said load circuit to said collector electrodes of said NPN transistor devices of the other load circuit; and means connecting a current source to said emitter electrodes of said transistor devices.

6. A flip-flop element, comprising, two parallel load circuits; each said load circuit including an NPN and a PNP transistor device; each transistor device having an emitter, a collector and a base electrode; the base electrodes of said transistor devices of each load circuit being connected through rectifier means to said collector electrodes of the other transistor device in each said load circuit; circuit means including rectifier means connecting the collector electrodes of said NPN and PNP transistor devices of each said load circuit; means connecting said base electrodes of said NPN transistor devices of each said load circuit to said collector electrodes of said NPN transistor devices of the other load circuit; and means connecting a current source to said emitter electrodes of said transistor devices.

References Cited in the file of this patent

UNITED STATES PATENTS

| | | |
|---|---|---|
| 2,798,160 | Bruck et al. | July 2, 1957 |
| 2,846,652 | Cluwen | Aug. 5, 1958 |
| 2,879,412 | Hoge et al. | Mar. 24, 1959 |